Patented Feb. 6, 1923.

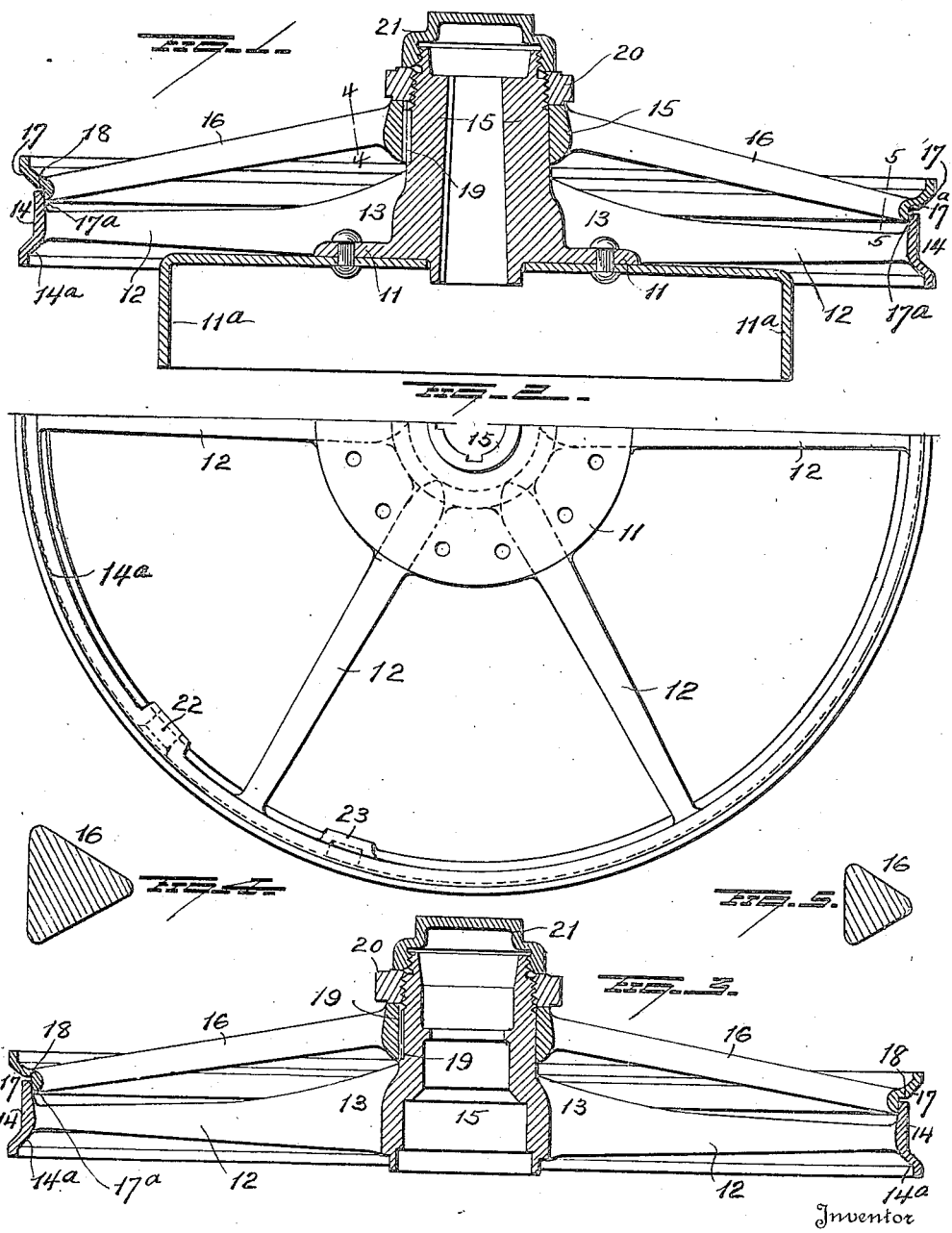

1,444,261

UNITED STATES PATENT OFFICE.

WILLIAM H. MORGAN, OF ALLIANCE, OHIO.

METAL WHEEL.

Application filed March 9, 1922. Serial No. 542,468.

*To all whom it may concern:*

Be it known that I, WILLIAM H. MORGAN, a citizen of the United States, and a resident of Alliance, in the county of Stark and State of Ohio, have invented certain new and useful Improvements in Metal Wheels; and I do hereby declare the following to be a full, clear, and exact description of the invention, such as will enable others skilled in the art to which it appertains to make and use the same.

My invention relates to metal wheels for vehicles, particularly self propelled vehicles employing demountable rims and tires, the object being to secure the rim to the wheel by a single securing means which will evenly distribute the pressure around the entire circumference of the rim and thus maintain the concentricity of the rim with the axle.

With the wheels as now made, the rim is secured to the felly by a series of bolts and clips, the latter fulcruming on the felly and bearing against the demountable rim, in order to apply the rim properly, the bolts must be tightened gradually and successively, otherwise the clips which have a wedging action on the rim will force the latter off centre. With my construction the one means secures the removable clamping flange to the wheel with an even pressure around the entire periphery of the wheel, and frees the tire for its ready removal upon the removal of the hub cap and a single locking nut.

In the accompanying drawings: Figure 1 is a view in section of a rear driving wheel embodying my invention; Figure 2 is a view in elevation of half of the hub section of the same; Figure 3 is a sectional view of the front wheel; Figure 4 is a view in cross section on line 4—4 of one of the spokes and Figure 5 is a view on the line 5—5 of one of the spokes.

10 represents the hub of a rear wheel made of cast or forged metal preferably cast, and provided with a tapering bore adapted to be keyed to the axle in the usual and well known manner. This hub is provided at its inner end with an integral peripheral flange 11 to which the brake drum 11ª is bolted or riveted, and also with a series of spokes 12, which are preferably triangular in cross section as shown in figures 4 and 5, and are enlarged and tapered at their inner ends as at 13 to provide for great lateral strength at the point where it is most needed and where it would be apt to break under lateral shocks. These spokes are cast or forged integral with the hub and are also preferably tapered so as to be of less cross sectional area adjacent the felly 14. The latter is forged or cast integral with the spokes 12, and is provided on its inner side with an inwardly projecting inclined flange 14ª continuous around the wheel, and against which the demountable rim (not shown) rests and by which it is retained against inward displacement.

The rim clamping section of the wheel comprises a ring shaped member 15, machined to fit and having a sliding movement on the hub 10 adjacent the outer end of the latter. Cast or forged integral with this ring shaped member 15, are a series of spokes 16, which are connected at their outer ends by the integral circular rim clamping flange 17, the inner edge of which is of slightly less diameter than the rim 14 so as to rest within the latter with sufficient clearance between the outer edge of the rim and the shoulder 18 on the rim clamping flange 17 to permit the clamping flange 17 to engage and bear with sufficient pressure on the rim to hold the latter in place irrespective of any slight irregularities in the shape or size of the latter. The spokes 16 are also preferably triangular in cross section, and when applied to the hub, the spokes or ring on clamping section 15 alternate with the spokes 12 on hub 10.

The inner edge of the ring clamping flange 17 is beveled as at 17ª to permit the flanges to be readily entered within the felly 14.

Each section of the wheel has a plurality of spokes, preferably six, equally spaced, the spokes of one section arranged to alternate with the spokes of the other section, so that when the outer or clamping section is removed, ample and at least double space will be provided between the spokes of the section carrying the felly and brake drum for adjusting the drum and lubricating the parts thereof.

The hub 14 of the rear or driving wheel is keyed to the axle in the usual and well known manner, so that no change or alteration will be required in the standard makes of cars to receive the wheels, and the outer or rim clamping section of the wheel is keyed to the hub as at 19 for properly locating the spokes of the two sections; for positively driving the outer or clamping section, thus preventing any lost motion between the parts; adding strength in transmitting power from the axle to the tire and as above stated, compelling the proper assemblage of the parts.

The portion of the hub on which the ring 15 is mounted is cylindrical so that the ring has a free sliding but close fit thereon and it is adjusted and held in place by the clamping or lock nut 20 which has right hand threads, and the lock nut is held in place by the screw cap 21 which is of the ordinary construction screwed to the extreme end of the hub, the cap being cup shaped to house the nut (not shown) which locks the hub to the axle.

The spokes 12 of the rim carrying section of the wheel are inclined outwardly from the hub to the felly, and the spokes 16 of the clamping section have a greater inclination inwardly from the hub to the felly for the purpose of giving lateral strength to the wheel in the event of skidding, turning corners, striking stones or other obstructions, and generally for preventing the spokes from bending under any side shocks to which the tire may be subjected.

The felly has a hole 22 for the passage of the valve stem or air pipe from the inner tube of the tire, and is also preferably provided with a socket 23 which is formed on some tires or rims to prevent turning of the rim on the felly.

The spokes are preferably made tapering or triangular in shape, largest adjacent the hub so as to distribute the metal where it is most needed for strength.

This wheel is designed to be secured to the axle of a particular machine, without any change whatsoever in the latter and is also constructed to receive demountable rim without any change in the latter.

The wheel above described is the rear or driving wheel. The front wheel shown in figure 2 is identical with the latter except that the brake drum is omitted and the bore of the hub is constructed to rotate on the stub axles of the machine and is constructed to receive the roller bearings ordinarily employed.

With this construction it will be seen that the entire wheel is composed of only four parts including the nut and the cap, hence can be cheaply manufactured and assembled, and finished to resemble the ordinary wheels now in use and as it is of two cylindrical sections it will be seen that if the outer section should from any accidental cause come off and allow the tire to slip off, or should be distorted in shape, the inner section of the wheel would still support the load of the car and prevent the axle from dropping to the ground.

It is evident that many slight changes might be resorted to in the relative arrangement of parts shown and described without departing from the spirit and scope of my invention hence I would have it understood that I do not wish to confine myself to the exact construction and arrangement of parts shown and described but, Having fully described my invention what I claim as new and desire to secure by Letters-Patent, is:—

1. As a new article of manufacture, a metal wheel composed of integral hub, spokes and felly and an integral clamping ring spokes and clamping flange the latter cooperating with and constituting a part of the felly, and means for locking the clamping ring on the hub.

2. As a new article of manufacture, a metal wheel comprising an integral hub, spokes and felly, the latter having a rim holding flange, an integral clamping ring, spokes and clamping flange, the latter cooperating with the flange on the felly and holding the rim in place, the clamping ring being keyed to the hub but slidable and adjustable thereon and means for locking the clamping ring to the hub.

3. As a new article of manufacture, a metal wheel comprising a hub and an integral felly, the felly having a tire holding flange, a clamping ring keyed to the hub but slidable thereon and carrying an integral clamping flange, the inner edge of said flange adapted to underlie the felly, and means for locking the clamping ring to the hub.

4. In a metal wheel, the combination of a hub, spoke and felly all formed integral, the felly having a rim holding flange at its inner edge, a ring keyed to the hub, but slidable thereon and provided with integral spokes and rim clamping flange and means for locking said ring on the hub.

5. In a metal wheel, the combination of a hub, spokes and felly all formed integral, the felly having a rim holding flange at its inner edge, a ring keyed to the hub but slidable thereon, and provided with integral spokes and a rim clamping flange, the inner edge of said flange resting under the outer edge of the felly and means for locking the ring to the hub.

6. In a metal wheel, the combination of a hub, spokes and felly all formed integral, the spokes being slightly inclined outwardly and enlarged or reinforced at their inner ends, a ring keyed to the hub but slidable thereon, rearwardly inclined spokes integral with said ring and a rim clamping flange integral with the spokes, and cooperating with the flange on the felly.

7. In a metal wheel, the combination of a hub and integral felly, the latter having a rim holding flange at its inner edge, a ring keyed to but slidably mounted on the hub, a rim clamping flange integral with said ring and cooperating with the felly, and a threaded nut adjustable on the hub for forcing the ring inwardly.

In testimony whereof, I have signed this specification in the presence of two subscribing witnesses.

WILLIAM H. MORGAN.

Witnesses:
   A. W. BRIGHT,
   AUSTIN JAMES CLARE.